United States Patent [19]

Schaffron

[11] 4,333,790

[45] Jun. 8, 1982

[54] ROTARY BAG SEALING AND PERFORATING MACHINE

[76] Inventor: Helmut T. Schaffron, c/o Schaffron Machine & Engineering Co., 9 D, Harter Ave., Woodland, Calif. 95695

[21] Appl. No.: 174,164

[22] Filed: Jul. 31, 1980

[51] Int. Cl.³ .......................... B32B 31/18; B31B 1/26

[52] U.S. Cl. .................................... 156/510; 156/253; 156/308.4; 493/197; 493/202; 493/208; 493/370

[58] Field of Search ............... 156/251, 252, 253, 515, 156/510, 582, 583.1, 308.4; 493/208, 205, 202, 197, 370, 471

[56] References Cited

U.S. PATENT DOCUMENTS 3,350,988 11/1967 Schultz ................................ 493/197

3,773,596 11/1973 Kato .................................... 156/251

3,837,971 9/1974 Beck .................................... 156/251

3,982,991 9/1976 Hamm et al. ........................ 156/515

3,992,981 11/1976 Stock .............................. 156/515 X

*Primary Examiner*—John E. Kittle

*Attorney, Agent, or Firm*—Julian Caplan

[57] ABSTRACT

A web of flattened, tubular, heat-sealable bag material travels above and at the speed of a moving belt. Above the belt is a seal shaft which rotates a heated seal bar. The working edge of the seal bar may be adjusted inward and outward relative to its shaft. The edge causes a transverse seal to be made on the web at intervals. A rotary perforating knife is driven at the same speed as the seal shaft and, at a subsequent station, perforates the web proximate the seal. The linear speed of the edge of the seal bar is at the speed of the belt at the time of sealing contact (about 65°). The speed of the seal shaft for the remaining 295° is adjustable and thereby the distance between seals and perforations is adjustable.

17 Claims, 11 Drawing Figures

ROTARY BAG SEALING AND PERFORATING MACHINE

This invention relates to a new and improved rotary bag making machine which is adjustable for different spacings between the seals of the bags as well as the perforations between bags.

The present invention relates to the fabrication of plastic bags of the type formed from a flattened tube of a material such as polyethylene, wherein the bags are separated one from the other by a transverse seal and are perforated so that they may subsequently be separated one from the other by ripping each bag consecutively from a roll. Such bags are commonly used in many locations. A typical location is in the produce department of a grocery store wherein rolls of bags are located at convenient positions so that purchasers may rip off bags from the roll to package produce as required.

Heretofore, there have been several different systems for locating the transverse seals along the web of the flattened tube. Such systems have had at least two undesirable features. The most important undesirable feature is the fact that when the distance between seals is to be changed, portions of the machine must be dismantled and parts with different spacings must be substituted. Not only does this require duplication of parts for different bag lengths, but the machine must be down for a considerable period of time in order to change the parts, thereby interfering with production. One such prior art machine has used chains with transverse seal bars, and it has been necessary to substitute chains with different spacings between the bars. Another type machine has a drum head plate on each side of the machine and bars extending transversely between the heads.

The present invention does not require the use of change parts. Not only is no down time necessary to make changes, but it is even necessary in a preferred operation of the machine that the change in bag size be accomplished while the machine is actually in operation.

A second undesirable feature of prior art machines is the fact that the spacing bars thereof are heated only instantaneously by impulse heaters. Such operation requires temperature adjustments depending upon conditions in the factory and other circumstances which interfere with a uniform, consistent seal of the bags. In accordance with the present invention, the seal bar is continuously heated and its temperature is more accurately controlled.

Still another prior art bag making machine requires the use of an elliptic gear drive which causes the seal bar to oscillate in an arcuate path. Again, to change bag sizes considerable change of parts of the machine is required. All of the undesirable features of this type machine are absent in accordance with the present invention.

A feature of the present invention is the fact that the seal bar rotates through a continuous cycle but at different speeds at different angular positions in the cycle of rotation of the bar. Thus, at the time that the seal bar is in contact with the web, the linear speed of the seal bar equals the linear speed of the web. This condition exists for approximately 65° of the cycle of rotation of the seal bar. However, during the balance of the rotation of the seal bar, the operator may vary the speed of rotation of the bar. Hence, to make the spacing between bags less, the speed of the bar for 295° of its rotation is increased. To increase the distance between seals, the speed during 295° is decreased.

There are various means for operating the seal bar at dual speeds. The one described herein and illustrated in the accompanying drawings uses DC clutches. It will be understood, however, that various mechanical, electrical and hydraulic dual speed drive systems may be substituted for that hereinafter set forth.

A further feature of the present invention is the fact that only a single seal bar is required, rather than the multiple bars of some of the prior art machines. Hence, possibility of variation between the heat and other operational characteristics of multiple bars is avoided in accordance with the present invention.

A still further feature of the invention is the fact that the seal bar may be adjusted to accommodate and to match the speed of the web; and, further, to a limited degree, to change the duration of the time within which the bar is in contact with the web.

Still another feature of the invention is the fact that it is possible for the operator to change the distance between seals while the machine is in motion in a matter of seconds. Hence, if the original setting was in error or operating conditions change while the machine is in motion, adjustments of the distance between seals may be performed.

Another feature of the invention is the fact that the heater for the seal bar operates continuously rather than on impulse or intermittently as in the prior art machines, thereby improving the uniformity of seals.

Still another feature of the invention is the fact that the machine has provision to adjust the tension of the web as it proceeds through the machine. In accordance with the present invention, the web travels on top of an elongated, horizontal stretch of a continuous, uniformly moving belt. It is desirable that the web of bag material be slightly loose rather than taut as it travels over the belt. The present machine has means for adjusting the tension of the web.

A still further feature of the invention is the fact that the tension of the web as it passes under the seal bar is separately and independently adjustable for proper contact of the seal bar with the web in order to effect a proper seal.

Still a further feature of the invention is the fact that perforations are made across the web at a station remote from the sealing station, and the adjustment of the spacing between seals likewise effects an adjustment of the spacing between perforations.

A still further feature of the invention is adjustment so that the seals and perforations are located in phase to the printed or graphic material on the web. Thus, it is customary to preprint webs of plastic bag material with advertising matter. The seals and perforations should be located between such advertising material rather than interrupting the pattern. The present machine has provision for making adjustments so that the seals and perforations occur between consecutive advertising material displays.

Other objects of the present invention will become apparent upon reading the following specification and referring to the accompanying drawings in which similar characters of reference represent corresponding parts in each of the several views.

IN THE DRAWINGS

FIGS. 3A and 3B are fragmentary sectional views taken along lines 3A—3A and 3B—3B, respectively of FIG. 3.

Figures 1, 2:
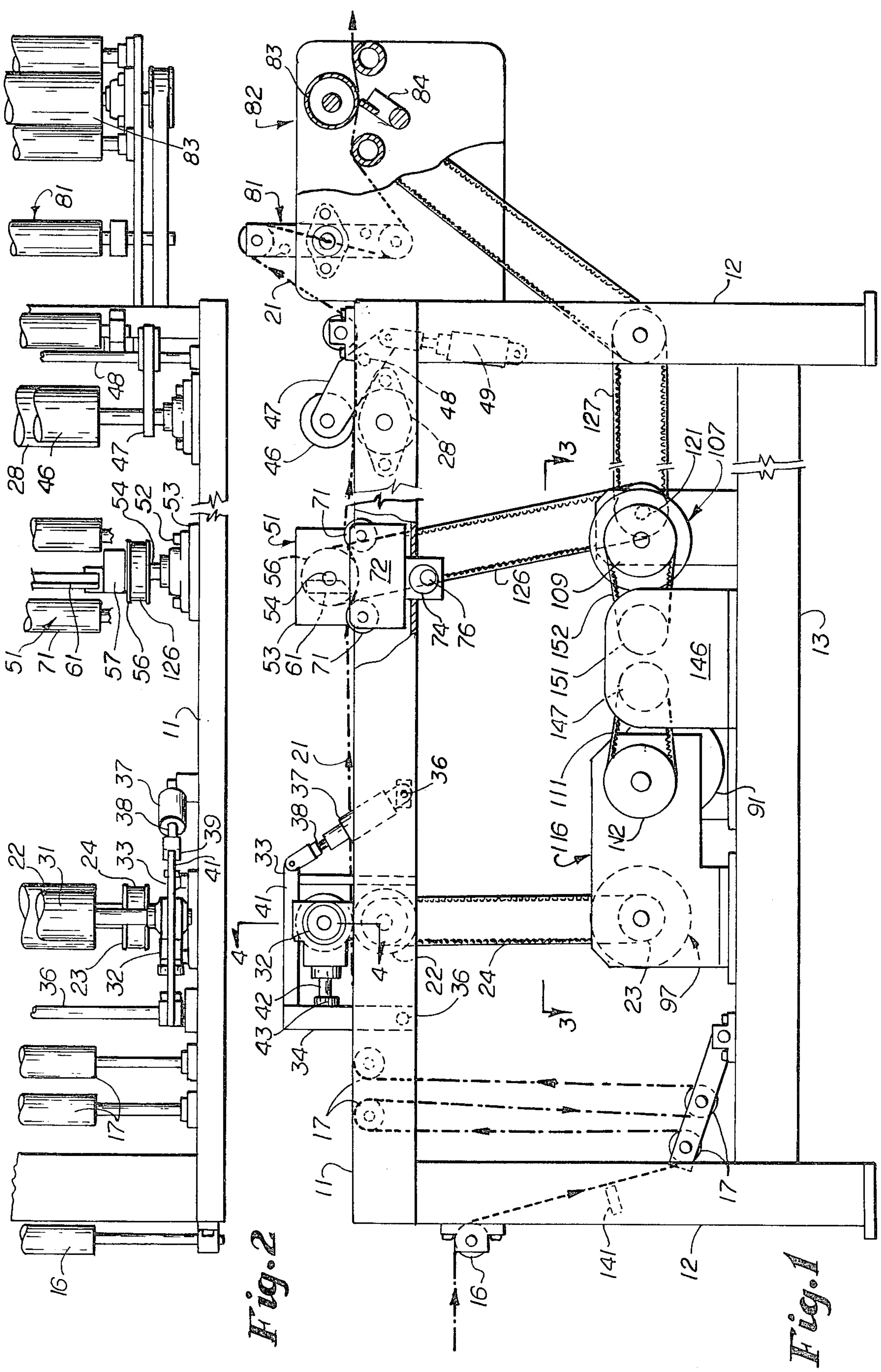
FIG. 1 is a side elevational view of the machine.
FIG. 2 is a top plan view of one-half of such machine.
Figure 4:
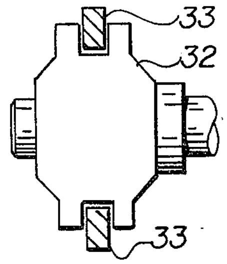
FIG. 4 is an enlarged sectional view taken substantially along the line 4—4 of FIG. 1.
Figure 5:
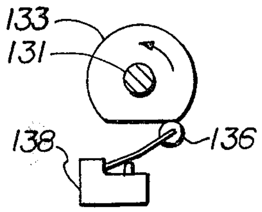
FIG. 5 is an enlarged fragmentary side elevational view of a portion of the machine.
Figure 6:
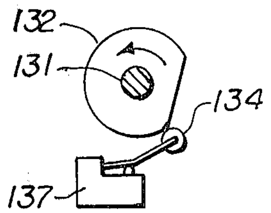
FIG. 6 is a sectional view taken substantially along the line 6—6 of FIG. 5.

The machine of the present invention has a frame consisting of elongated horizontal members 11 on each side supported by legs 12. Below the horizontal top members are lower horizontal members 13. A series of stations precede the main portion of the machine. Thus, a roll of flattened tubular film or plastic material is supported by roll support 16 on the left end of the machine as viewed in FIGS. 1 and 2. A web of material (not shown) is fed off of the film roll downwardly and then in an up and down path around dancer rolls 17 as well understood in this art. The details of these rolls form no part of the present invention and are not illustrated in detail.

Extending the length of the machine is a continuous belt 21 over which the web as it leaves the dancer rolls passes. Left belt roll 22 adjacent the left end of the frame is driven by means of pulleys 23 and belt 24 from lower shaft 26 by a drive hereinafter described in detail. At the opposite end of the machine is an idler belt roll 28 around which the far end of the belt 21 passes. It is desirable that the web as it passes along the upper stretch of the belt 21 be relaxed rather than taut. For this purpose, a left stuffing roll 31 is located above the entrance belt roll 22. The web, being fed horizontally from the right-handmost dancer roll 17, passes between the belt 21, which is turned by the drive belt roll 22 and the stuffing roll 31. Roll 31 is journalled in a take-up bearing 32, the upper and lower edges of which are formed with grooves into which fit frame bars 33. The frame bars 33 are fixed to a downward extending arm 34 which is pivoted by means of pivot shaft 36 to frame member 11. The stuff roll bars 33 may be caused to move upward and downward around pivot 36 by means of an air cylinder 37 which is pivoted to frame member 11 at its lower end and the ram 38 of which is attached by clevis 39 to extension 41 of upper frame member 33.

Bearing 32 is pivotally connected at one end to threaded rod 42 threaded into a nut 43 fixed to arm 34 of stuffing roll frame 33. By turning rod 42, the stuffing roll 31 may be moved horizontally relative to belt roll 22 and such movement varies the point of contact between the idler stuffing roll 31 and the belt 21 forward or rearward of a vertical plane through the axis of rotation of the belt roll 22. Regardless of the horizontal position of contact, by actuation of the ram 38, proper contact with the web is assured.

At the opposite end of the machine, there is a second stuffing roller 46 directly above the axis of the idler belt roll 28. The second stuffing roller 46 is journalled in a lever 47 pivoted to frame member 11 by pivot shaft 48 and raised and lowered by means of cylinder 49 pivoted to legs 12 and to an end of lever 47. Since the position of roll 46 relative to roll 28 is constant, moving the point of contact of roll 31 and belt 21 forward and rearward relative to the axis of roll 22 affects the tension of the web as it passes over the upper stretch of belt 21.

Figure 7:
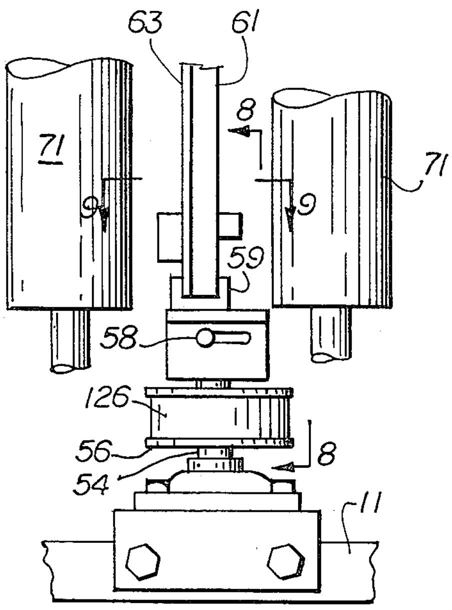
FIG. 7 is a fragmentary plan view in enlarged scale of a portion of FIG. 1.

Approximately midway of the frame is seal station 51. Journalled in bearings 52 fixed to an extension 53 above frame member 11 is a shaft 54 driven through pulley 56 by means hereinafter described. Fixed to shaft 54 is a generally U-shaped member 57 having diametrically opposed elongated slots 51 into which fit screws 58 threaded into seal bar mounting 59. By moving the seal bar mounting 59 to the right or left, as viewed in FIG. 7, the eccentricity of the seal bar 57 which is secured to the mounting 59 relative to the axis of shaft 54 is adjusted.

Figure 9:
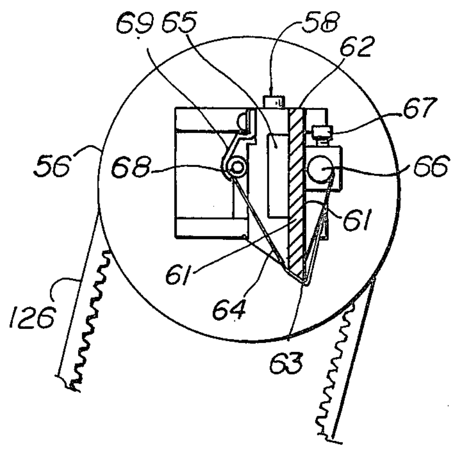
FIG. 9 is a sectional view taken substantially along the line 9—9 of FIG. 7.
Figure 8:
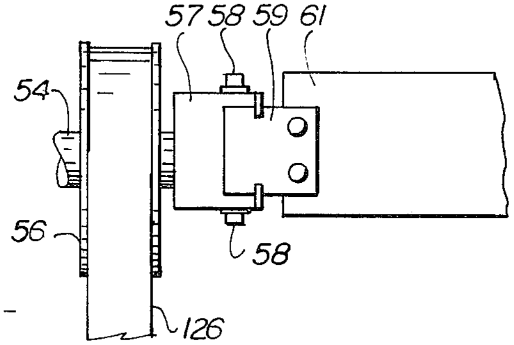
FIG. 8 is a fragmentary elevational view of a portion of FIG. 7.
Figure 11:
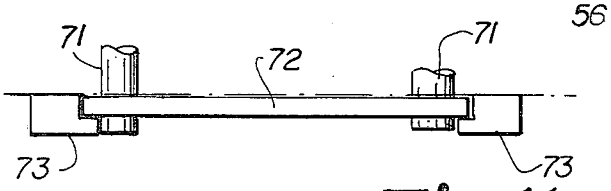
Figure 10:
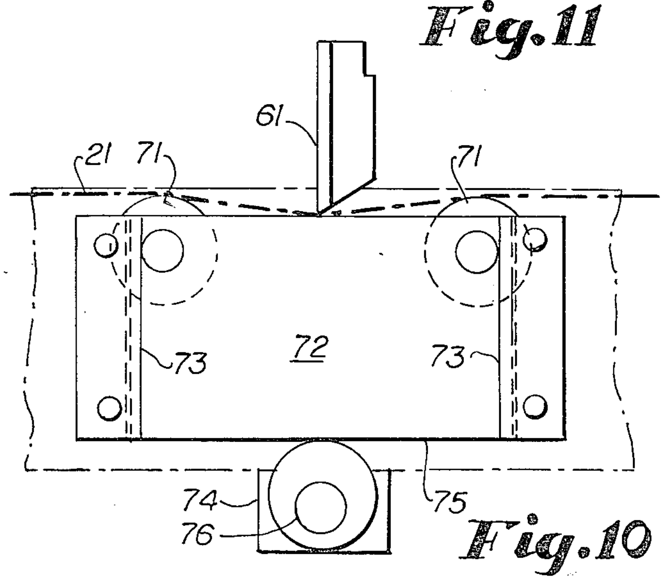

Seal bar 61, as best shown in FIG. 9, consists of a flat piece 62 of stock held in proximity to an electric heating element 65 surrounded by backing which is fixed to mounting 61. The edge 63 of bar 61 is generally crowned and the shape is subject to considerable variation, the shape being similar to those used in prior art machines of the type heretofore mentioned. A thin strip 64 of glass fabric cloth coated with Teflon may be wound around a roller 66 held in position by screw 67 and then extending down around the edge 63 of the bar 61 and thence to a second roller 68 on the opposite side of the seal bar held in place by a clip 69. Thus as the strip wears, it may be wound from one roller to the other so that a fresh area contacts the web and eliminates sticking. When the heated lower end of the seal bar comes in contact with the web, it causes a transverse seal to be formed in the web by heat.

By adjustment of the eccentricity of the seal bar 61 by means of moving the screws 58 in slot 57, the linear speed of the seal bar edge 63 may be made to match the speed of belt 21 and also, within limits, alter the time during which the seal bar 67 is in contact with the web.

The upper stretch of the belt 21 immediately below the seal bar 61 passes over two rollers 71 which are mounted in vertically moveable plates 72, the forward and rearward edges of which are caught in guides 73 in the frame. The lower edge of each plate 72 rests upon an eccentric 74, the shaft 76 of which is mounted in the main frame member 11. By turning shaft 76, the eccentric 74 raises and lowers plate 72 and hence roller 71 and adjusts the tension of the seal belt 21 as the seal bar 61 comes in contact with the web supported thereon.

After passing through the rolls 28 and 46 on the right-hand end of the machine as heretofore described, the web travels around a take-up section 81 and thence through a rotary perforator 82 which forms perforations transversely across the web. At the perforator station is a bed knife 83 and there-above is a rotary perforator knife 84 driven by pulley means hereinafter described. The perforator knife 84 in conjunction with the bed knife 83 cause perforations to be formed at the same intervals as the seals are formed by the seal bar 61 and likewise in close proximity thereto. From the perforator station, the web is wound into a roll at a winder station (not shown) the details of which are not illustrated but are well understood in the art.

Figure 3:
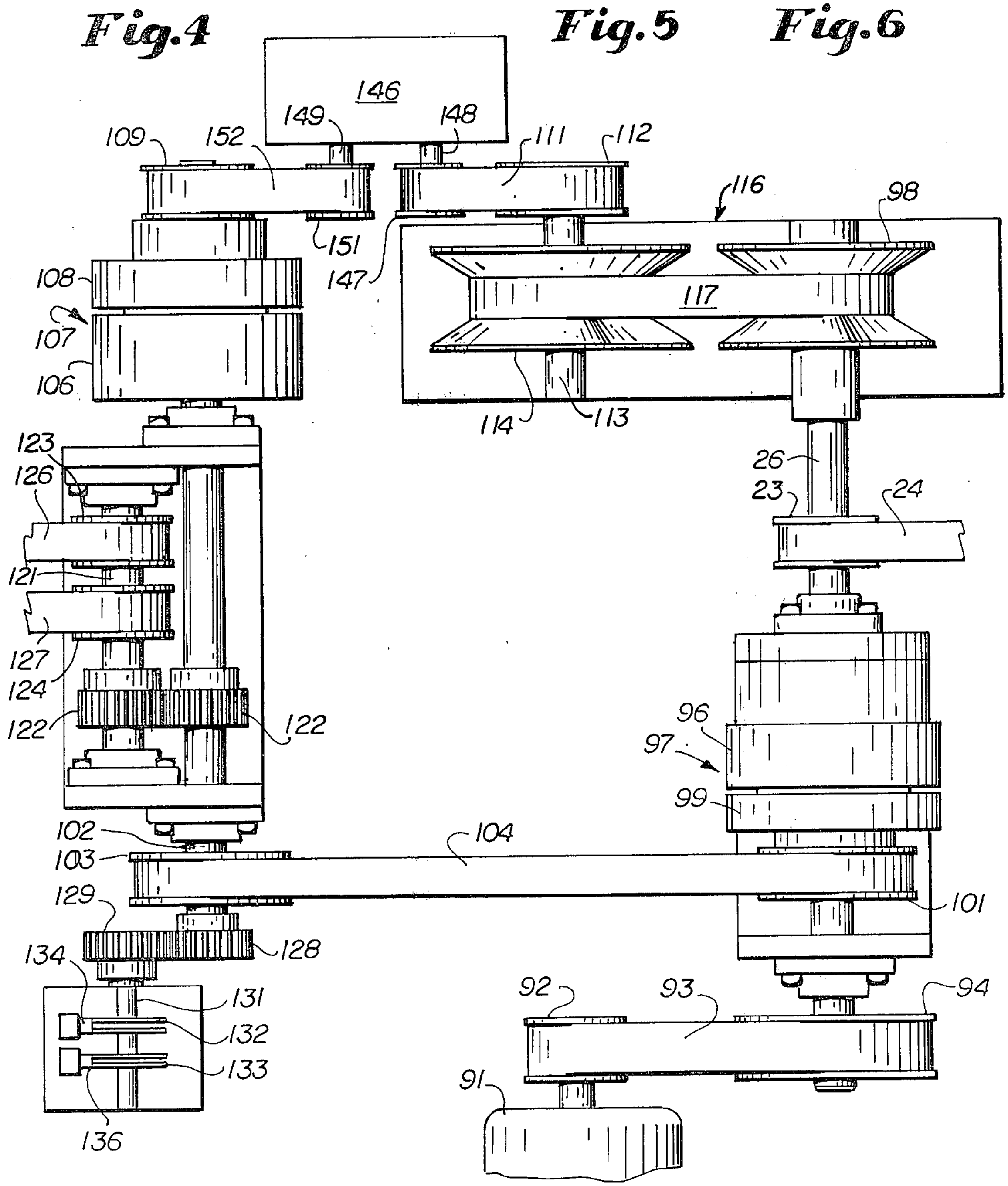
FIG. 3 is a somewhat schematic sectional view taken substantially along the line 3—3 of FIG. 1.

The drive for the belt 21, seal bar 61 and perforator 82 are best illustrated in FIG. 3. Thus, motor 91 drives a pulley 92 connected by belt 93 to a pulley 94 on shaft 26. The pulley 23 which drives belt 24, which drives the main belt roll 22, is likewise on said shaft 26. A fixed section 96 of first portion DC clutch 97 is located on shaft 26 as is the first conical pulley 98 of the variable drive. Connected to clutch plate 99 of the first clutch 97 but otherwise loose relative to shaft 26 is pulley 101.

Parallel to shaft 26 is shaft 102 which carries pulley 103 connected by belt 104 to pulley 101. Also on shaft 102 is fixed clutch section 106 of second DC clutch 107, the clutch plate 108 of which is fixed to pulley 109 connected by belt 111 and pulley 112 to shaft 113 of the second set of conical pulleys 114 of the variable drive 116. Optionally, as shown in FIG. 3, a differential unit 146 may be interposed as hereinafter described. Pulleys 98 and 114 are connected by belt 117. It is the characteristic of variable drive 116 that by moving the sets of conical pulleys 98 and 114 toward or away from each other the effective diameters thereof may be varied by means forming no part of this invention and not herein illustrated or described in detail. Hence, the relative speeds of shaft 26 and clutch plate 108 may be varied by means of the variable drive 116.

Purely for purposes of reversing direction, there is a jack shaft 121 parallel to shaft 102 and connected thereto by gears 122 at a one-to-one ratio. Mounted on jack shaft 121 are pulleys 123, 124 for the belts 126, 127 which lead to the seal bar 61 and to the perforator 82, respectively. Shaft 102 also carries a gear 128 which meshes with gear 129 driving cam shaft 131. Cam shaft 131 carries two cams 132, 133 the follower rollers 134, 136 of which control switches 137 and 138 which are electrically connected to the clutches 97 and 107.

When, by means of the cams 132, 133, the clutch 97 is engaged, the plate 99 is driven at the same speed as shaft 26 and hence shafts 26, 102 and 121 are driven at that speed. This causes the seal bar shaft 54 and the perforator 82 to rotate at speeds such that the linear speeds of the seal bar edge 63 and the perforator knife 84 equal the linear speed of the belt 21.

However, after the seal bar and perforator have been in contact with the web travelling at the same rate as the belt 21 for approximately 65° of rotation of shaft 131, these elements rotate out of contact with the web. Their speed is then controlled by the adjustment of the variable speed drive 116. Thus, cams 132 and 133 cause clutch 97 to disengage and clutch 107 to engage. Thereupon, the belts 126 and 127 are driven at whatever speed is set by adjustment of the variable drive 116. The faster belts 126 and 127 are driven, the less the distance between successive seals or perforations; and the slower they are driven, the greater the distance between seals or perforations. Accordingly, to make adjustment for this speed, the operator, while the machine is moving, causes the conical pulley segments 98, 114 to move toward and away from the companion segments to create this speed adjustment.

It is also desirable to have the location of the seal and perforator be in phase with any printed and graphic material on the web. Such printed and graphic material conventionally has a marker along one edge of the web which is sensed by a photo sensor 141 located in the path of travel in the web, as shown at the left end of FIG. 1. As shown schematically in FIG. 3, when such a phase control is incorporated in the machine the shaft 113 of variable speed adjuster is not directly connected to shaft 102. Instead, differential speed adjuster 146 (controlled by photo sensor 141, as well understood in this industry) is interposed. Belt 111 drives pulley 147 on shaft 148 of adjuster 146. The phase of shaft 149 of adjuster 146 is changed depending upon sensor 141. Shaft 149 carries pulley 151 connected by belt 152 to pulley 109. Where the web is not preprinted, adjustment 146 may be omitted and belt 111 drives pulley 109.

As used in the claims, the term "lines" means a heat seal or equivalent; the term "line placement means" means a heat seal bar or equivalent; and the term "second line placement means" means a perforator or equivalent.

What is claimed is:

1. In a machine for forming transverse lines across a moving web and wherein the distances between said lines may be varied, a frame, web advancing means for advancing said web longitudinally of said frame, a shaft extending transversely of said frame, line placement means rotated by said shaft for placing said transverse lines on said web during a portion of the cycle of rotation of said shaft, a motor, first means for driving said web advancing means from said motor, second means for rotating said shaft from said motor for said first portion of its cycle of rotation at a first speed having a first ratio to the speed of said first means and for a second portion of the cycle of rotation of said shaft at a second speed having a second ratio different from said first ratio, and second means for increasing and decreasing said second speed.

2. A machine according to claim 1 in which the linear speed of said line placement means at the first speed of said shaft equals the linear speed of said web.

3. A machine according to claim 1 in which said web is heat-sealable and said line placement means comprises a seal bar having a heated seal edge for forming transverse seals on said web.

4. A machine according to claim 3 in which said line placement means further comprises mounting means for mounting said seal bar on said shaft, said mounting means being adjustable to vary the distance of said seal edge relative to the axis of rotation of said shaft.

5. A machine according to claim 4 in which said web advancing means comprises a continuous belt extending longitudinally of said frame and driven by said first means, said web being supported by the top stretch of said belt, and which further comprises a sub-frame mounted on said frame below said shaft for vertical movement of a pair of transverse second shafts supporting said top stretch of said belt, said second shafts being mounted in said sub-frame, means for vertically adjusting said sub-frame relative to said frame, whereby the effective pressure of said edge on said web may be adjusted.

6. A machine according to claim 1 which further comprises a second shaft extending transversely of said frame remote from said first shaft, said first and second shafts being driven in timed relation, and second line placement means rotated by said second shaft.

7. A machine according to claim 6 in which said web is heat sealable and in which said first mentioned line placement means comprises a seal bar having a heated seal edge for forming transverse seals on said web and said second line placement means comprises a rotary perforating knife for forming lines of perforations transversely on said web.

8. A machine according to claim 1 in which said means for advancing said web comprises a continuous belt extending longitudinally of said frame, said web being supported by the top stretch of said belt, a drive roll at a first end of said belt, an idler belt roll at a second end of said belt opposite said first end, said first means driving said drive roll.

9. A machine according to claim 8 which further comprises a stuffing roll above said drive roll, a sub-frame mounting said stuffing roll and means supporting said sub-frame from said frame, said web feeding over said belt and under said stuffing roll.

10. A machine according to claim 9 in which said stuffing roll is longitudinally movable relative to said sub-frame whereby the line of contact of said stuffing roll with said web may be adjusted relative to the axis of said drive roll.

11. A machine according to claim 10 which further comprises a second stuffing roll above said idler belt roll, said web feeding over said belt and under said second stuffing roll, whereby tension of said web may be adjusted by moving said first mentioned stuffing roll longitudinally.

12. A machine according to claim 10 in which said sub-frame is pivoted relative to said frame and which further comprises means for pivoting said sub-frame to raise and lower said first mentioned stuffing roll relative to said drive roll.

13. A machine according to claim 1 in which said second means comprises a second shaft driven by said motor, said first means being driven from said second shaft, a third shaft, said first-mentioned shaft being driven from said third shaft, variable drive means for driving said third shaft from said second shaft, and control means under the control of the operator for said variable drive means to drive said third shaft at the same speed as said second shaft or at a different speed than said third shaft.

14. A machine according to claim 13 in which said variable drive means comprises a first clutch on said second shaft, said first clutch having a first fixed member fixed to said second shaft and a first plate engageable and disengageable with said first fixed member, a second clutch on said third shaft, said second clutch having a second fixed member fixed to said third shaft and a second plate engageable and disengageable with said second fixed member, means interconnecting said first plate and said third shaft, said variable drive means interconnecting said second shaft and said second plate, said control means being arranged to engage said first clutch and disengage said second clutch during a first portion of the cycle of rotation of said first-mentioned shaft and then to engage said second clutch and disengage said first clutch during a second portion of said cycle.

15. A machine according to claim 14 in which said clutches are DC clutches.

16. A machine according to claim 14 in which said variable drive means comprises a first pair of conical pulleys on said second shaft, a second pair of conical pulleys on said second plate, a V-belt around said pulleys and means for simultaneously pushing said first pair toward each other while pulling said second pair away from each other.

17. A machine according to claim 1 which further comprises means for advancing and retarding said web relative to said web advancing means to adjust the positions of said lines without otherwise altering the distances between adjacent lines.

* * * * *